United States Patent [19]
Nakagawa et al.

[11] Patent Number: 4,755,063
[45] Date of Patent: Jul. 5, 1988

[54] TEMPERATURE COMPENSATED DATA RECORDER

[75] Inventors: George Nakagawa; Robert M. Nakagawa, both of Modesto, Calif.

[73] Assignee: DTR International, Inc., Modesto, Calif.

[21] Appl. No.: 46,827

[22] Filed: May 5, 1987

[51] Int. Cl.[4] .............................................. G01K 1/02
[52] U.S. Cl. ...................................... 374/186; 73/430; 346/33 TP
[58] Field of Search ........................... 374/186; 73/430; 346/33 TP

[56] References Cited

U.S. PATENT DOCUMENTS

| 3,167,966 | 2/1965 | Ashleman | 73/430 X |
| 3,919,632 | 11/1975 | Roerty | 73/430 X |
| 4,007,637 | 2/1977 | Nakagawa et al. | 374/186 |
| 4,135,400 | 1/1979 | Maxwell et al. | 374/186 |

Primary Examiner—Daniel M. Yasich
Attorney, Agent, or Firm—Flehr, Hohbach, Test, Albritton & Herbert

[57] ABSTRACT

A recorder is disclosed for producing a continuous data record and comprises a case, a strip chart which is wound from a chart storage compartment onto a spring-given take-up spool and a speed-reducing governor comprising a paddle wheel, immersed in viscous fluid, operatively connected to the driven take-up spool by a gear train. The paddle wheel contains temperature-responsive paddles which extend or retract in response to increases and decreases in the temperature to compensate viscosity changes in the fluid. Also, the drive spring is mounted within the take-up spool inside a free-rotating sleeve which prevents spring distortions from interfering with the smooth operation of the take-up spool.

8 Claims, 3 Drawing Sheets

TEMPERATURE COMPENSATED DATA RECORDER

BACKGROUND AND SUMMARY OF THE INVENTION

The present invention relates in general to strip chart data recorders, to strip chart temperature recorders and, more specifically, to strip chart recorders in which the chart's mechanical drive mechanism may be subjected to adverse temperature conditions and to wide variations in ambient temperature.

In recorders of the type described above, it is highly desirable that the accuracy of the chart drive not be affected by the ambient temperature. For example, in strip chart recorders which are used to monitor ambient temperatures using, for example, a temperature responsive recording stylus, it is necessary that the very ambient temperature which the device monitors not preclude accurate operation.

A continuous or strip chart temperature recorder which combines inexpensive construction with accuracy is described in my U.S. Pat. No. 4,007,637, issued Feb. 15, 1977. This patent is hereby incorporated by reference in its entirety. The continuous chart temperature recorder described in the referenced U.S. Pat. No. 4,007,637 patent is a disposable recorder for measuring ambient temperature over long periods of time (days or weeks) without maintenance or attention and, thus, is ideal for applications such as monitoring the temperature in refrigerated trucks or railroad cars.

The disposable continuous chart temperature recorder covered in the referenced U.S. Pat. No. 4,007,637 patent uses a spool-to-spool tape-type chart for recording temperature as a function of time. The chart or tape is unwound from a feed roll or spool onto a take-up roll which is driven by a spring. The force and angular velocity of the coil torsion spring decreases as the coil unwinds. This compensates for the increasing diameter and speed of the chart on the tape-up roll and provides relatively constant chart speed. Alternatively, the chart's markings in units of time along its length can be tailored to changes in speed as the spring unwinds and the chart winds.

A temperature-operated stylus records ambient temperature on the moving chart and a speed governing gear train is connected to the feed spool or the take-up spool and is operative to govern the speed of travel of the spools. Specifically, the controlling unit or governor comprises a multiple gear, speed-reducing gear train, one end gear of which is connected to the shaft of the unwind spool. The gear at the opposite end of the train is meshed with a paddle wheel. Both the gear train and the paddle wheel are mounted in a housing containing a viscous liquid. The drag due to the viscous liquid helps to reduce the speed of the gear train and aid speed control.

Despite its relatively inexpensive construction, the disposable-type temperature recorder disclosed in my referenced U.S. Pat. No. 4,007,637 patent provides useful temperature monitoring over a wide range of ambient temperatures. This accuracy requires the use of a viscous fluid such as Dow-Corning #200 Fluid which has a relatively good (flat) temperature to viscosity profile. However, the viscosity of such fluids does undergo change when subjected to wide ranges of temperatures.

SUMMARY OF THE INVENTION

In view of the above discussion, it is a primary object of the present invention to provide a data recorder and a continuous chart temperature recorder of the type described above and which automatically compensates for any temperature-induced viscosity changes of the the damping fluid.

It is another, related object to provide such a recorder having a paddle wheel which is designed to automatically compensate for temperature-induced changes in the viscosity of the damping fluid and thereby to provide an improved speed governor for the recorder.

In one aspect, my present invention is an improvement of the chart-type recorder disclosed in my referenced '637 patent which incorporates a temperature responsive paddle wheel. That is, temperature-responsive blades incorporated into the paddle wheel extend and retract as the ambient temperature increases or decreases, to offset the tendency of the gear train to speed up or slow down, respectively, due to viscosity variations in the damping fluid.

In still another, more particular aspect, the temperature compensated recorder of my present invention comprises a case; a take-up spool rotatably mounted in the case; a chart wound between the take-up spool and a feed compartment which contains the rolled supply/feed end of the chart; drive means connected to the take-up spool for rotating the take-up spool to wind the chart from the feed spool onto the take-up spool; a recording mechanism including a movable stylus for scribing on the tape at a point between the spools; and a speed control device connected to the spools and operative to govern the speed of travel of the chart between the spools. The speed control device includes a gear train which is immersed in viscous fluid and is operatively coupled at one end to the take-up spool and at the opposite end to a paddle wheel also immersed in the viscous fluid. The paddle wheel includes extendible paddles and a thermostatic coil which is responsive to temperature variations and operatively coupled to the paddles for extending and retracting the paddles to increase and decrease the rotational drag of the paddle wheel.

The above and other aspects of my present invention are described below with reference to the drawings, in which.

DETAILED DESCRIPTION OF THE INVENTION

Overall Construction and Operation

Figure 1:
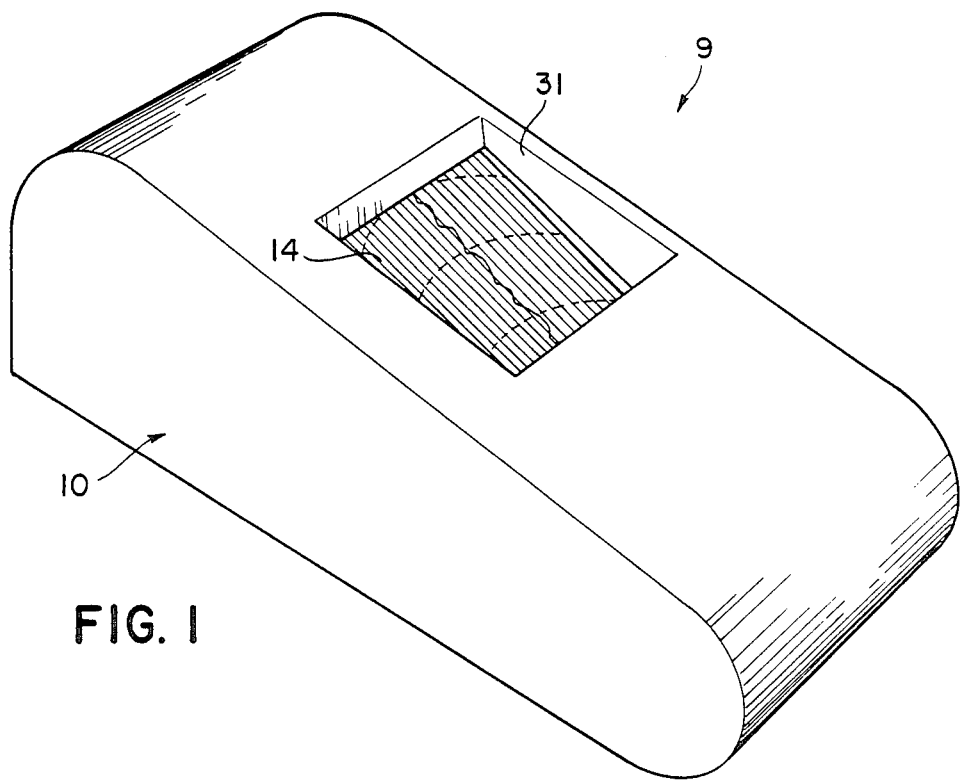
FIGS. 1 and 2 are, respectively, a perspective view and a top plan view of an exemplary data recording device which benefits from incorporation of my improved, constant movement, temperature-compensated governor.
Figure 2:
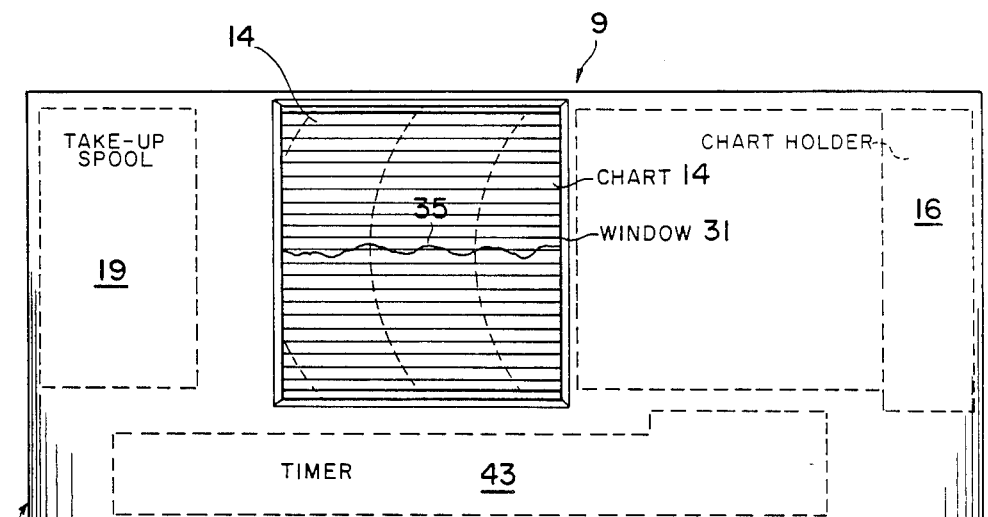
Figure 3:
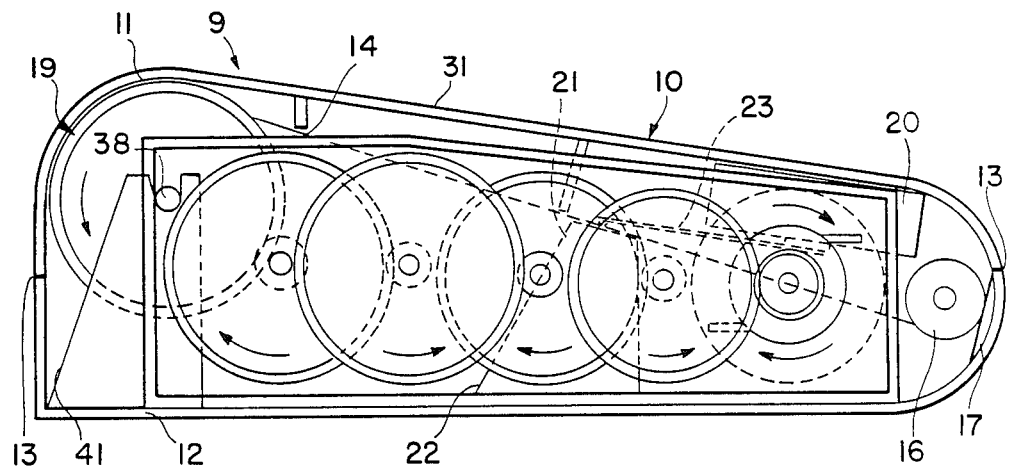
FIG. 3 is a vertical cross-sectional view through FIG. 2.

FIGS. 1, 2 and 3 are, respectively, a perspective view, a top plan view and a vertical cross-section view of an exemplary temperature recorder 9 which incorporates my improved, constant movement, temperature-compensated speed control or governor system.

Referring initially to these three figures, the recorder 9 comprises a plastic case 10 which typically is formed as separate sections such as upper section 11 and lower section 12. The sections are joined along separation/parting lines 13—13. See FIG. 3. The recorder 9 may be the disposable type described in my above-referenced '637 patent, in which the case 9 is permanently sealed along the separation lines 13—13. Provisions such as grooves/cutting lines (not shown) permit removal of the recording chart or tape 14. Alternatively, the case sections 11 and 12 can be joined by screws or other removable fastening means to permit disassembly and reuse of the recorder.

Referring further to FIGS. 1–3, the tape-type continuous recording chart 14 is removably mounted at one end to take-up (power) spool 19, for example, by inserting one end of the chart into a receiving slot in the spool 19, and at the opposite end is rolled and contained in the chart storage compartment 16. The storage compartment 16 is mounted on bracket 17 which in turn is solvent welded to the plastic lower case 12. As a result of this mounting arrangement, rotation of the take-up spool mechanism 19 (illustratively in the counter-clockwise direction shown in FIG. 3) unwinds the chart 14 from chart storage compartment 16 and over the angled upper surface 21 of a "writing pad" support 22 which supports the chart 14 beneath writing stylus 23. The use of the storage compartment substantially eliminates the tension and associated risk of damage to the chart and binding that occurs in reel-to-reel (spool-to-spool) drive systems.

Figure 4:
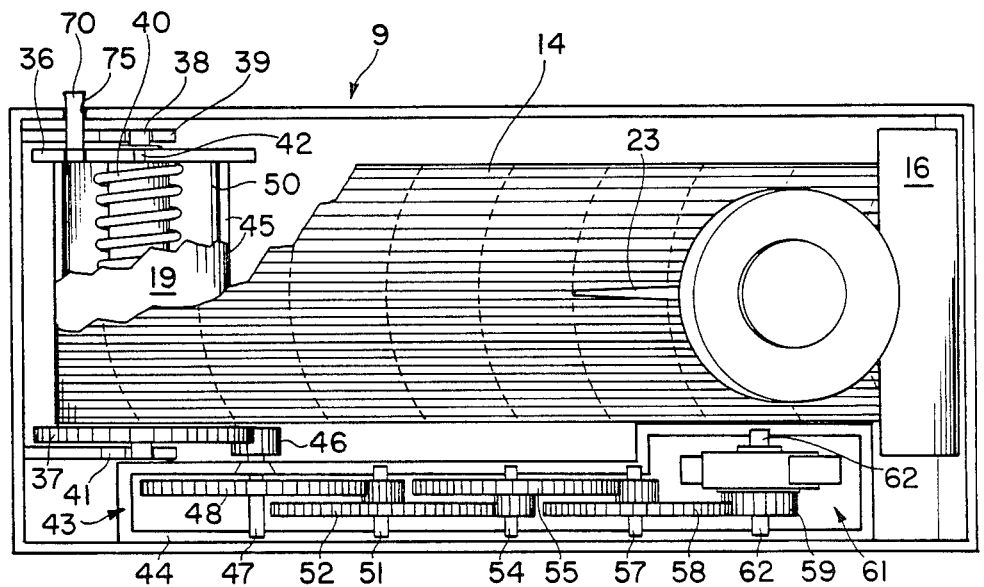
FIG. 4 is a top plan view of the recorder of FIGS. 1 and 2 with upper portions of the case and components broken away, and partially in section, showing internal components of the recorder.
Figure 6:
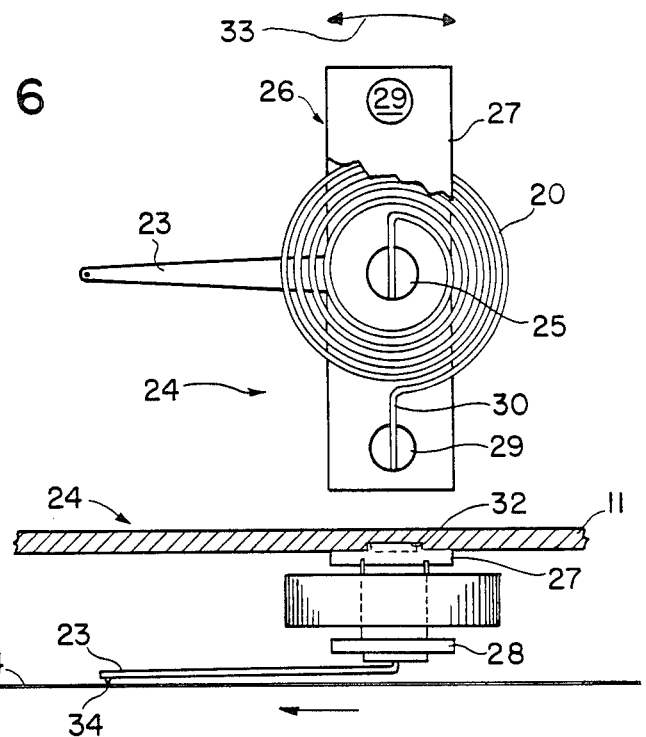
FIGS. 5 and 6 are, respectively, a side elevational view partly in section and a top plan view partly in schematic, of the temperature-responsive stylus mounting assembly.
Figure 5:
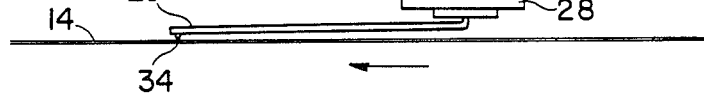

Referring to FIG. 4 and, in particular, to FIGS. 5 and 6, the stylus 23 is part of a coil-type temperature-responsive writing mechanism 24 which is mounted to the upper case section 11. The stylus 23 is mounted to a bi-metallic coil 20 which winds and unwinds in response to variations in the temperature to swing the stylus from side-to-side and, thus, record the temperature on the moving strip chart 14. The stylus 23 is affixed to a shaft 25, which is rotatably journaled within a coil holder assembly 26. The coil holder assembly 26 comprises top and bottom mounting bars 27 and 28 which are mounted to and separated by spaced posts 29—29. The stylus shaft 25 is rotatably journaled between the bars 27 and 28. Outer bend 30 of the bi-metallic coil 20 is fixed to one of the two posts 29 (inserted into a slot in the post) whereas inner bend is similarly attached to the rotatable stylus shaft 25. As a consequence of this mounting, temperature-induced winding or unwinding of the coil produces the aforementioned pivotal recording movement of the stylus. In addition, the stepped upper end of the pivotal stylus shaft is inserted into a mating recess 32 in the upper wall 11 of the case 10 to permit calibration of the stylus. Calibration is effected by rotating the coil holder assembly 26 about the pivot point 32, as indicated by the arrow 33 in FIG. 6, to coordinate the stylus movement with the chart 14; the upper bar 27 may then be affixed to the wall of the upper case, e.g., by solvent welding, to maintain the calibration setting.

The stylus 23 has a scribing point 34 (FIG. 5) which produces a scribed line 35, FIG. 2, on the chart or tape 14. Preferably, the chart 14 is the pressure-sensitive type, which does not require an inking stylus. Thus, as the ambient temperature increases or decreases, the thermometer coil 20 expands or contracts or vice versa and reversibly pivots the stylus 23 about its pivot mounting shaft 25, thereby producing the scribe line 35 (FIG. 2) of temperature as a function of time on the continuously moving chart 14. As viewed through the case window 31 in FIGS. 1 and 2, the chart 14 is printed with arcuate lines representing temperature while the length of the tape is marked in units of time to reflect the cumulative elapsed time along the chart relative to the origin at the leading end thereof. As mentioned, the scale of the markings can be varied to allow for variations in the chart speed due to the unwinding of the drive spring and/or the increasing diameter of the winding chart.

As explained in greater detail below, typically the recorder uses a coil spring drive mechanism 40 (FIG. 4), both for convenience and simplicity. Such a conventional spring provides a relatively constant (or predictable) movement of the chart 14, FIG. 2, so that the time required to wind the chart 14 to a given longitudinal position corresponds precisely to the elapsed time marked on the chart. Quite obviously, this capability exists only if the overall drive mechanism accurately translates the biasing force of this spring 40 into corresponding translation of the chart motion and only if the motion is unaffected by, that is, independent of, the very changes in ambient temperature which the device 9 is designed to record. Please note, mechanical or temperature-induced inaccuracies or inconsistencies in the translational movement of the chart cannot be corrected and may be cumulative. For example, an error of a few percent in the chart translational speed which exists for only a very short period of time is, nonetheless, applied for the remainder of the chart travel, unless cancelled by an offsetting error. Also, small errors applied for lengthy periods of time (the recorder is designed to operate for days, weeks, or even months) can eventually result in very large errors in the recorded time.

As mentioned, the present invention is an improvement of the chart described in my above-referenced U.S. Pat. No. 4,007,637 patent in that both the spool drive mechanism and the speed governor, described below, are specially designed for error-free operation.

Power Take-Up Spool Mechanism 19

Referring primarily to FIG. 4, as mentioned previously, the wound coil spring 40 drives the power spool/take-up roll mechanism 19. However, when fully wound, such wire coil springs tend to distort and rub against the inside wall of the outer tube or spool 45, causing irregular power output from the spring motor 40 and, thus, irregularities in the rotational speed of the spool 45 and in the resulting movement of the chart 14.

The power take-up spool mechanism 19 is designed to eliminate this friction-induced irregularity in the movement of the chart 14. Specifically, the mechanism 19 comprises two cylindrical tubes, the previously mentioned outer tube or spool 45 and an inner tube 50. The inner tube 50 is inserted into the spool 45 (take-up spool) and constitutes a sleeve which is not attached to the spool 45. The outer or take-up spool 45 is mounted to end caps 36 and 37 which are themselves rotatably mounted or journaled on a shaft 38 which is fixedly mounted in yokes 39 and 41. One of the end caps 41 is a spur gear which is the input from the gear train.

Drive spring 40 has one end mounted to the fixed shaft 38 and the opposite end 42 connected to one of the rotatable end caps 36. The enlarged section of the shaft 38 between the end caps has a diameter selected so that the wire coil drive spring 40 cannot be wound beyond the stress point of the wire. Also, the inner spool 50 is freely rotatably within the outer spool 45. Inner tube 50 has an outside diameter that is just slightly smaller than the inside diameter of the larger, outer tube 45. Thus, the inner tube 50 is a freely rotating sleeve for the spring 40.

As a consequence of the above-described construction, any distortions in the drive spring 40 are intercepted by the inside of the inner tube or sleeve 50, and the outer tube 45 remains freely rotatable about the sleeve 50, free of interference from any distortions in the spring.

Please note, a number of holes are provided along the periphery of end cap 36 for receiving control pin 70, which is inserted via locking hole 75 in case 44 into the cap 36 to prevent operation (unwinding) of the chart 14 and, obviously, is removed to allow operation of the recorder.

Temperature Compensated Gear Train Speed Governor

Referring primarily to FIG. 4, the speed control governor 43 comprises a gear train which is immersed in viscous fluid within a housing 44 in case 10. The gear train includes the end cap/spur gear 37 which is formed as part of the powered outer spool 45 and is the input to the power spool mechanism 19 from the gear train. This spur gear 37 meshes with a spur-pinion gear 46 mounted on shaft 47 which is rotatably journaled within the opposite side walls of the enclosure 44. The shaft 47 drives another large diameter spur gear 48 which in turn drives an arrangement of three cluster gears 52, 55 and 58 mounted on respective shafts 51, 54 and 57, which cause a substantial multiplying effect. The last of these gears 58 is meshed with a spur-pinion gear 59 which is part of the novel paddle wheel assembly 61. The paddle wheel is also immersed in the viscous fluid.

Figure 7:
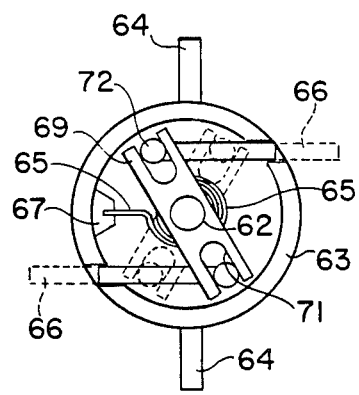
FIG. 7 is a simplified elevation view of the temperature-responsive paddle wheel assembly used in the recorder of FIGS. 1 and 2.
Figure 8:
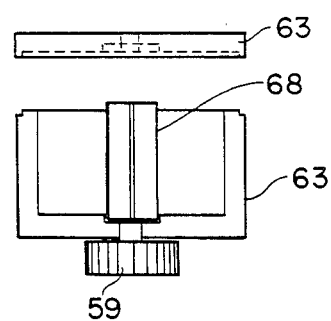
FIG. 8 is a simplified partially exploded, partially cut-away plan view of the temperature-responsive paddle wheel assembly of FIG. 7.

FIGS. 7 and 8 are, respectively, a simplified elevational view and a partially exploded, partially cut-away top plan view of a presently preferred embodiment of the temperature responsive paddle wheel assembly of my present invention.

Referring primarily to these two figures, as well as to FIG. 4, the paddle wheel assembly 61 is mounted on a shaft 62 journaled in opposite end walls of the enclosure 44. The paddle wheel assembly 61 comprises a hollow ring housing 63 which has the hollow spur-pinion gear 59 formed as one end thereof. A pair of fixed blades or paddles 64—64 extend radially from the housing and provide resistance to rotation in the viscous fluid contained in housing 44, which resistance or drag is multiplied by the gear train to provide controlled slow velocity movement of the spring-driven take-up spool 19 and chart 14.

A second pair of blades or paddles 66—66 extend through slots in the ring housing 63—63. A thermostatic bi-metallic thermometer-type torsion coil 65 is positioned within the housing 63 and has one end anchored to the inside wall of the housing, at 67, and the opposite end anchored (not shown) to the slotted paddle wheel shaft 68 (FIG. 7). Shaft 68 is mounted for free rotation on inner concentric shaft 62. A blade-activating bar or cross-piece 69 is rotatably mounted near the center thereof on the shaft 62 and is fixed to shaft 68. This bar 69 has slots 71—71 in its opposite ends which act as cam surfaces and engage cam follower projections 72—72 on the inner end of the extendible blade/paddles 66—66 to move each blade inwardly or outwardly of the paddle wheel housing 63 in response to ambient temperature change-induced winding and unwinding of coil 65.

That is, when the ambient temperature increases, coil 65 unwinds and pivots bar 69, to cam the blades 66—66 radially outwardly. This increases the rotational drag of the paddle wheel and compensates for the temperature-induced decrease in the viscosity of the fluid. Conversely, when the temperature decreases, the coil 65 contracts, and rewinds, causing the camming bar 69 to retract the blades 66—66. This decreases the rotational drag and offsets the temperature-induced increase in viscosity.

The winding/unwinding of the coils 65 and the retraction/extension of the blades/paddles 66—66 are proportional to the temperature change, as is the change in viscosity of the viscous fluid. As a consequence, the system effectively provides a constant drag and temperature independent chart operation over a wide range of ambient temperatures, from at least about −20° F. to +125° F.

In short, the temperature-induced variation in drag provided by the paddle wheel precisely offsets the changes in viscosity of the viscous fluid so that the speed governor functions properly over wide ranges of temperature.

Also, a small fixture may be incorporated into the paddle wheel assembly to set or calibrate the initial position of the extendible blades 66—66. For example, the blades 66—66 can be set to the fully retracted position at the lower end of the expected ambient temperature range, such as, for example, −20° F.

Table 1 below lists one example of suitable relationships between diameter and number of teeth for the gear train.

TABLE 1

| Gear | No. Teeth | P.D. (Pitch Diameter) |
|---|---|---|
| 41 | 120 | 1.666 |
| 46 | 24 | .333 |
| 48 | 120 | 1.666 |
| 49 | 20 | .277 |
| 52 | 120 | 1.666 |
| 53 | 20 | .277 |
| 55 | 108 | 1.500 |
| 56 | 20 | .277 |
| 58 | 90 | 1.250 |
| 59 | 30 | .416 |

It should be obvious that the above-described temperature compensated, uniform drive motion strip chart recorder is not limited to application to temperature recorders. The recording mechanism 24 is independent of the drive mechanism and any of the various types of conventional recording mechanisms such as barometric humidity, impact, can be substituted for the described temperature recording mechanism.

The description herein of the preferred and alternative embodiments of my present invention will permit those of usual skill in the art to readily derive additional modifications and variations which are within the scope of the claims which follow.

We claim:

1. A stress-relieved, temperature variation-compensated data recorder comprising a case, a chart storage and feed compartment, a take-up spool rotatably mounted in the case, a chart wound and stored in said feed compartment and extending to the take-up spool, drive means connected to the take-up spool for rotating the take-up spool to wind the chart from the chart storage compartment onto the take-up spool, a recording mechanism including a movable stylus mechanism for scribing on the winding tape, and a speed control device connected to the spool and operative to govern the speed of travel of the chart between the spool, said speed control device comprising a gear train immersed in a viscous fluid and operatively coupled at one end to said take-up spool and at a second end to a paddle wheel rotatably mounted on a shaft, said paddle wheel being immersed in the viscous fluid and comprising extendible paddles and means responsive to temperature variations and operatively coupled to said extendible paddles for extending and retracting said paddles relative to the shaft to increase and decrease the rotational drag of said paddle wheel for compensating temperature-induced changes in the viscosity of the viscous fluid.

2. The recorder of claim 1, wherein said stylus mechanism is temperature responsive for recording variations in temperature.

3. The recording device of claim 1, said temperature responsive means comprising a cross-piece rotatably mounted on the paddle wheel shaft and having slots therein engaging cam following projections on the paddles for camming the paddles inwardly and outwardly upon rotation of said cross-piece, and a temperature responsive coil connected to the cross-piece for reversibly rotating said cross-piece in response to fluctuations in the ambient temperature.

4. The recorder of claim 3, wherein said stylus mechanism is temperature responsive for recording variations in temperature.

5. The recorder of claim 1, said take-up spool comprising a shaft mounting a drive spring, an outer tube operatively connected to said spring for rotation thereby to wind said chart on said take-up spool, and an inner sleeve freely rotatably positioned within the outer spool and over the drive spring for intercepting distortions in said drive spring.

6. The recorder of claim 5, wherein said stylus mechanism is temperature responsive for recording variations in temperature.

7. The recording device of claim 5, said temperature responsive means further comprising a cross-piece rotatably mounted on the paddle wheel shaft and having slots therein engaging cam following projections on the paddles for camming the paddles inwardly and outwardly upon rotation of said cross-piece, and a temperature responsive coil connected to the cross-piece for reversibly rotating said cross-piece in response to fluctuations in the ambient temperature.

8. The recorder of claim 7, wherein said stylus mechanism is temperature responsive for recording variations in temperature.

* * * * *